(12) United States Patent
Smeja

(10) Patent No.: US 10,749,466 B2
(45) Date of Patent: Aug. 18, 2020

(54) SOLAR PANEL MOUNTING CLAMP AND SYSTEM

(71) Applicant: Solar Connections International, Inc., McHenry, IL (US)

(72) Inventor: Michael V. Smeja, Inverness, IL (US)

(73) Assignee: Solar Connections International, Inc., McHenry, IL (US)

( * ) Notice: Subject to any disclaimer, the term of this patent is extended or adjusted under 35 U.S.C. 154(b) by 0 days.

(21) Appl. No.: 15/645,818

(22) Filed: Jul. 10, 2017

(65) Prior Publication Data

US 2018/0013382 A1 Jan. 11, 2018

Related U.S. Application Data

(60) Provisional application No. 62/360,452, filed on Jul. 10, 2016.

(51) Int. Cl.
*F16B 37/14* (2006.01)
*F24S 25/615* (2018.01)
(Continued)

(52) U.S. Cl.
CPC ............. *H02S 40/34* (2014.12); *F16B 2/065* (2013.01); *F16B 37/145* (2013.01); *F16B 43/025* (2013.01); *F24S 25/20* (2018.05); *F24S 25/61* (2018.05); *F24S 25/615* (2018.05); *F24S 25/636* (2018.05); *H01R 4/30* (2013.01); *H01R 4/64* (2013.01); *H01R 9/18* (2013.01); *H02S 30/00* (2013.01); *H02S 30/10* (2014.12); *H02S 40/30* (2014.12); *F16B 2/12* (2013.01); *F16B 5/121* (2013.01); *F16B 39/282* (2013.01); *F24S 2025/6008* (2018.05); *H02S 20/23* (2014.12); *Y02B 10/12* (2013.01); *Y02E 10/47* (2013.01)

(58) Field of Classification Search
CPC ........ F24J 2/5205; F16B 37/145; F24S 25/61; F24S 2025/6008; F24S 25/615; F24S 25/636; H01R 4/30; H01R 9/18; H02S 20/23; H02S 30/00; H02S 30/10; H02S 40/30; Y02B 10/12
See application file for complete search history.

(56) References Cited

U.S. PATENT DOCUMENTS

| | | | |
|---|---|---|---|
| 2010/0192505 A1* | 8/2010 | Schaefer | A47B 96/14 52/653.2 |
| 2010/0276558 A1* | 11/2010 | Faust | F24J 2/5205 248/222.14 |

(Continued)

*Primary Examiner* — Magali P Slawski
(74) *Attorney, Agent, or Firm* — Reed Smith LLP

(57) ABSTRACT

A system having a plurality of solar panel mounting clamps for mounting a plurality of solar panels including a plurality of threaded projections fixed in a mounting surface; a plurality of the solar panel mounting clamps, each respectively disposed upon one of the plurality of threaded projections such that the threaded receiving portion of each solar panel mounting clamp receives each respective threaded projection, such that the plurality of solar panel mounting clamps are capable of securing a plurality of solar panels to the mounting surface such that each clamp makes a conductive bond with one or more panels such that each panel shares a common ground. The system may include one or more mounting plates to rest upon the mounting surface that has one or more retainer clip to ease in cable management.

17 Claims, 15 Drawing Sheets

(51) Int. Cl.
*H02S 40/30* (2014.01)
*H02S 30/00* (2014.01)
*H02S 30/10* (2014.01)
*H02S 20/23* (2014.01)
*H02S 40/34* (2014.01)
*H01R 4/64* (2006.01)
*H01R 4/30* (2006.01)
*F16B 43/02* (2006.01)
*F24S 25/61* (2018.01)
*F24S 25/636* (2018.01)
*F24S 25/20* (2018.01)
*F16B 2/06* (2006.01)
*H01R 9/18* (2006.01)
*F16B 2/12* (2006.01)
*F16B 5/12* (2006.01)
*F24S 25/60* (2018.01)
*F16B 39/282* (2006.01)

(56) References Cited

U.S. PATENT DOCUMENTS

2011/0214368 A1* 9/2011 Haddock ............... F24S 25/615
    52/173.3
2011/0299957 A1* 12/2011 Young ................... F24S 25/33
    411/401
2012/0244729 A1* 9/2012 Rivera .................. F24J 2/4638
    439/97
2013/0162823 A1* 6/2013 Pierce ............. G08B 13/19621
    348/148

* cited by examiner

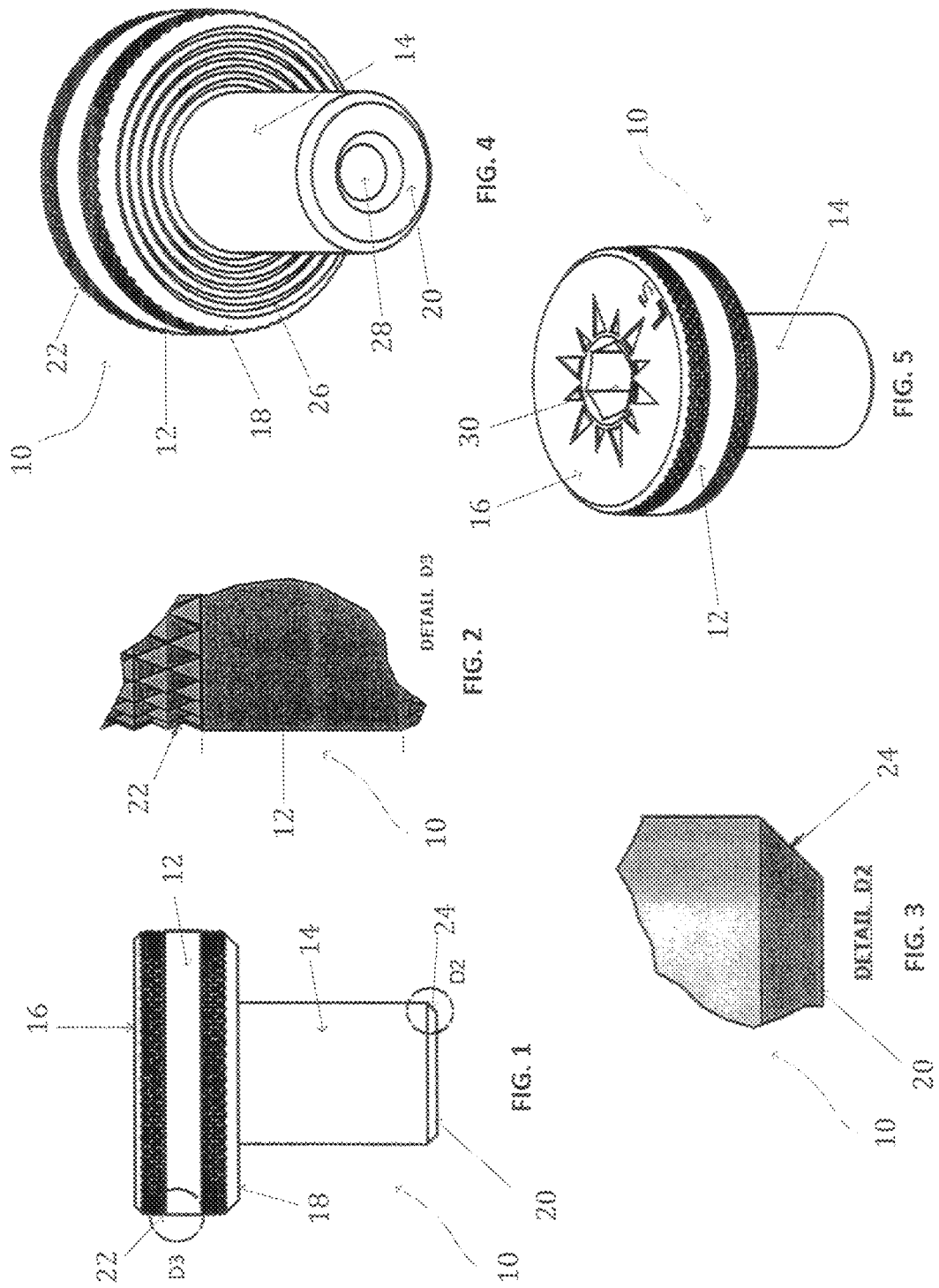

SECTION A-A

SECTION A-A

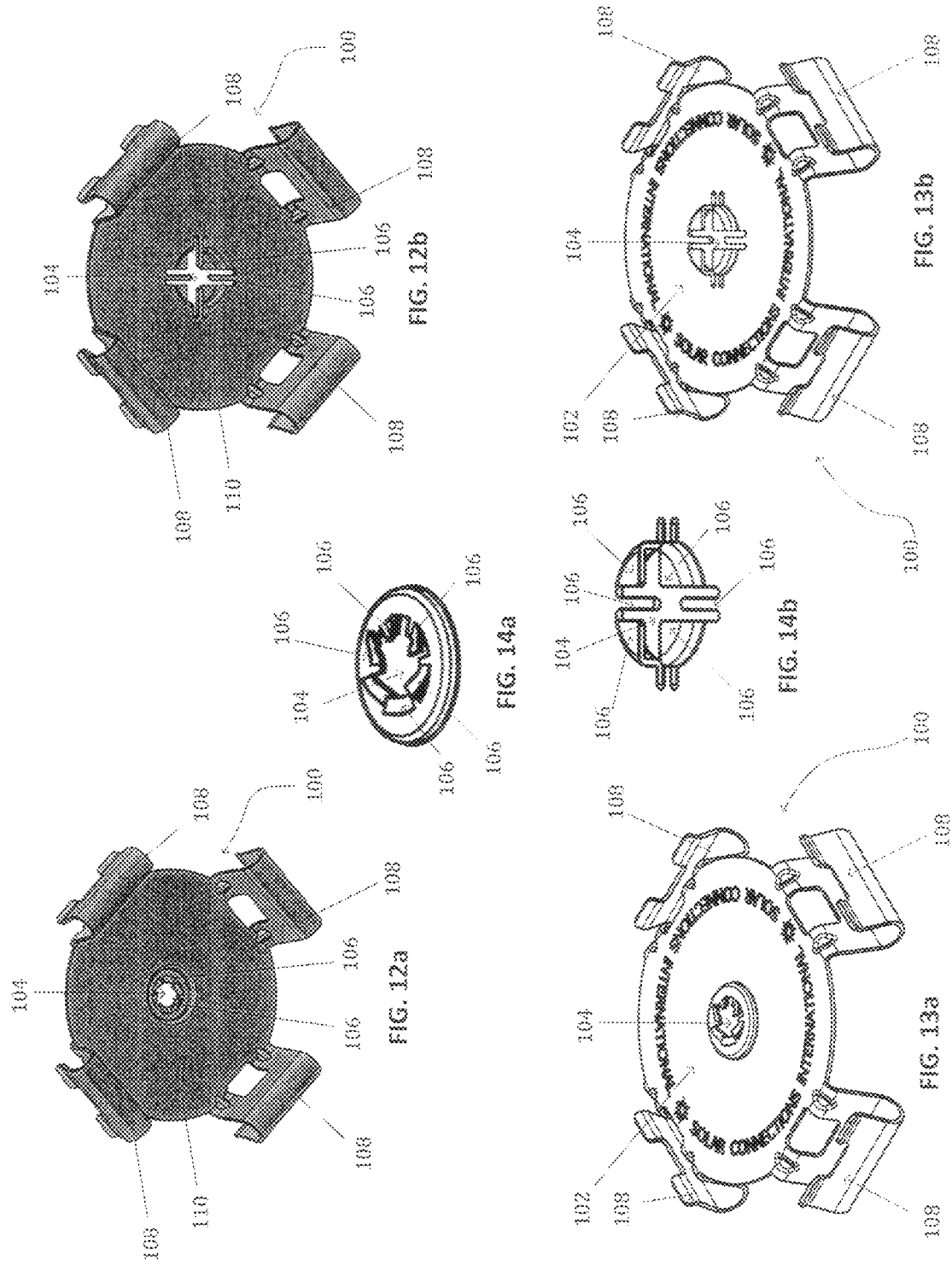

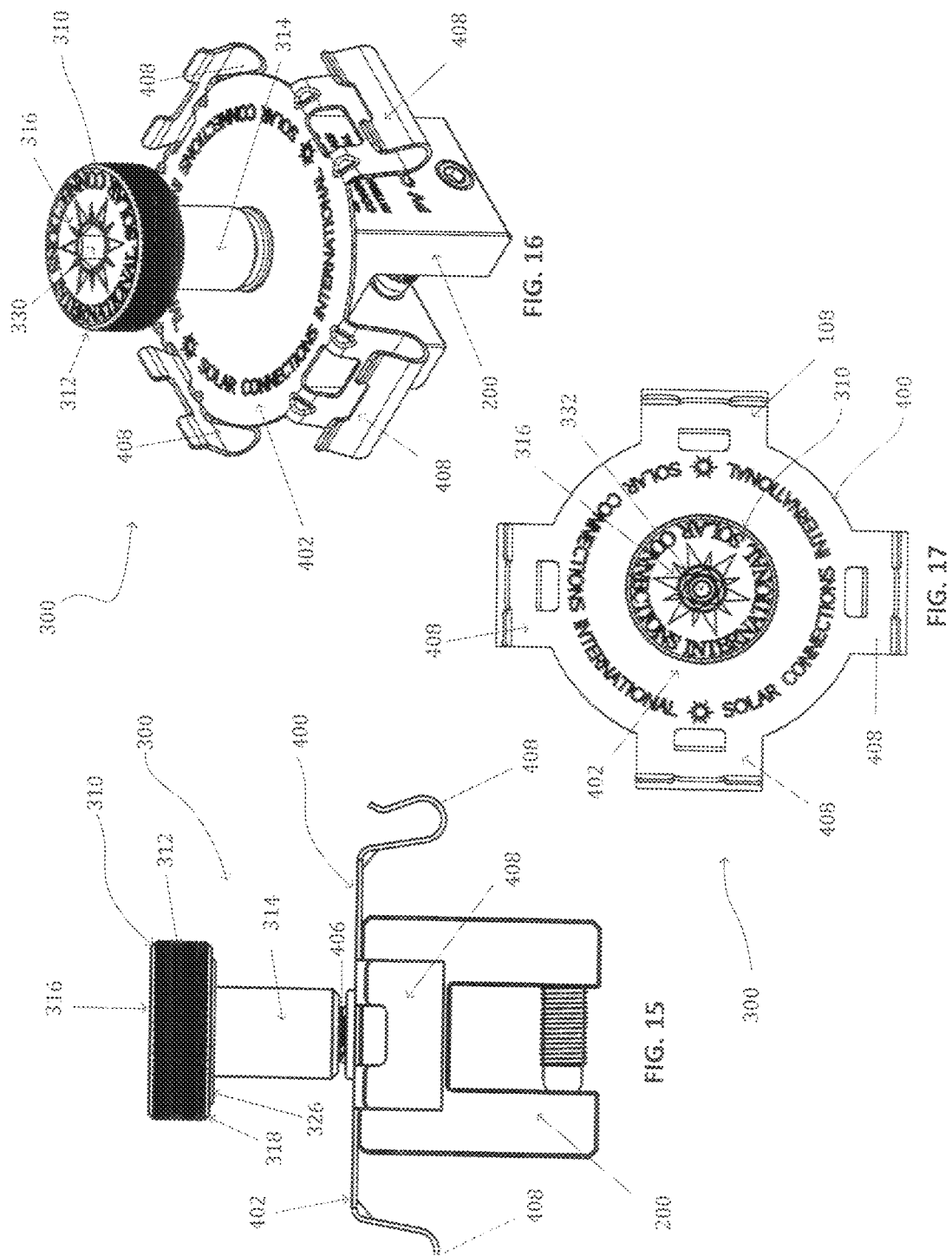

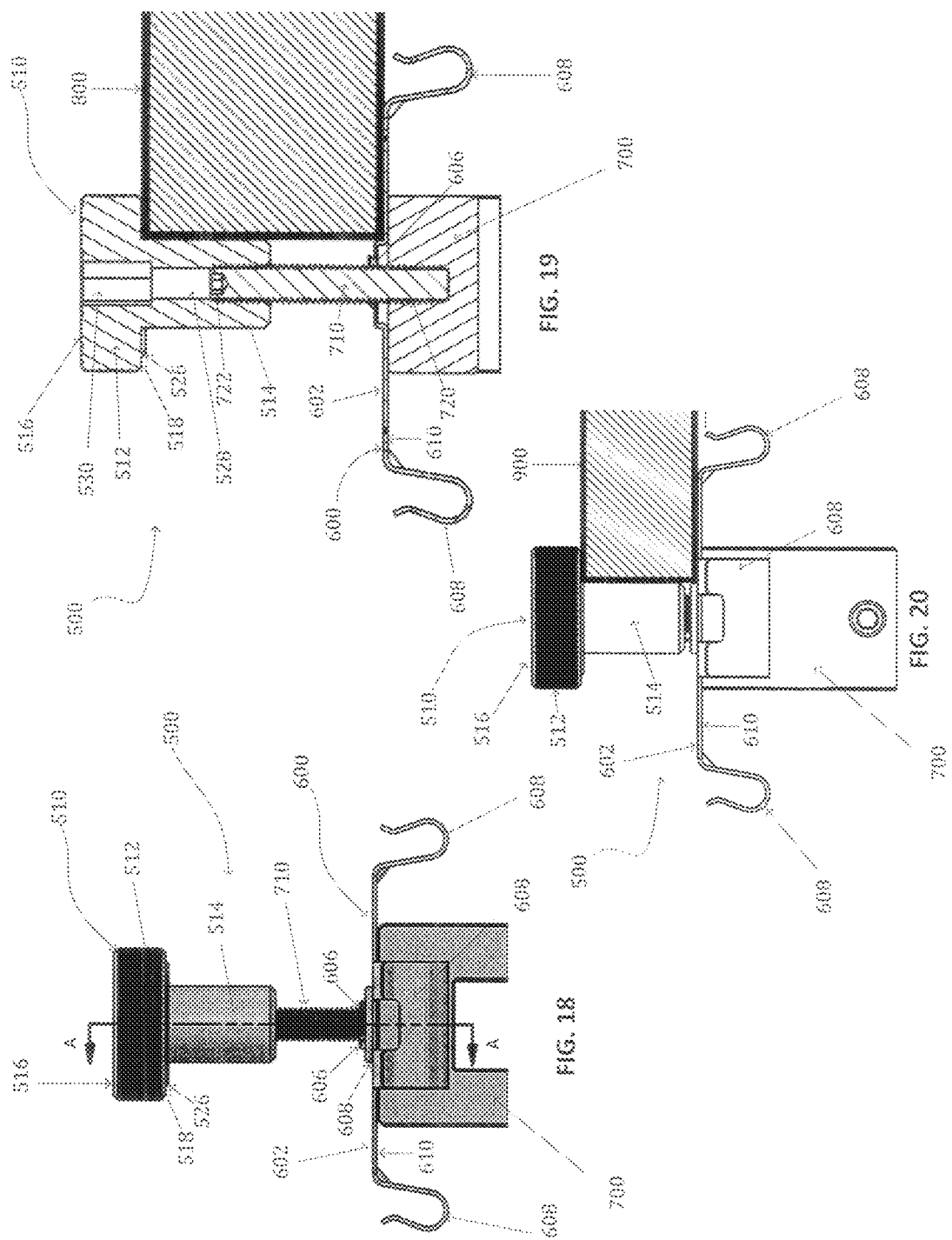

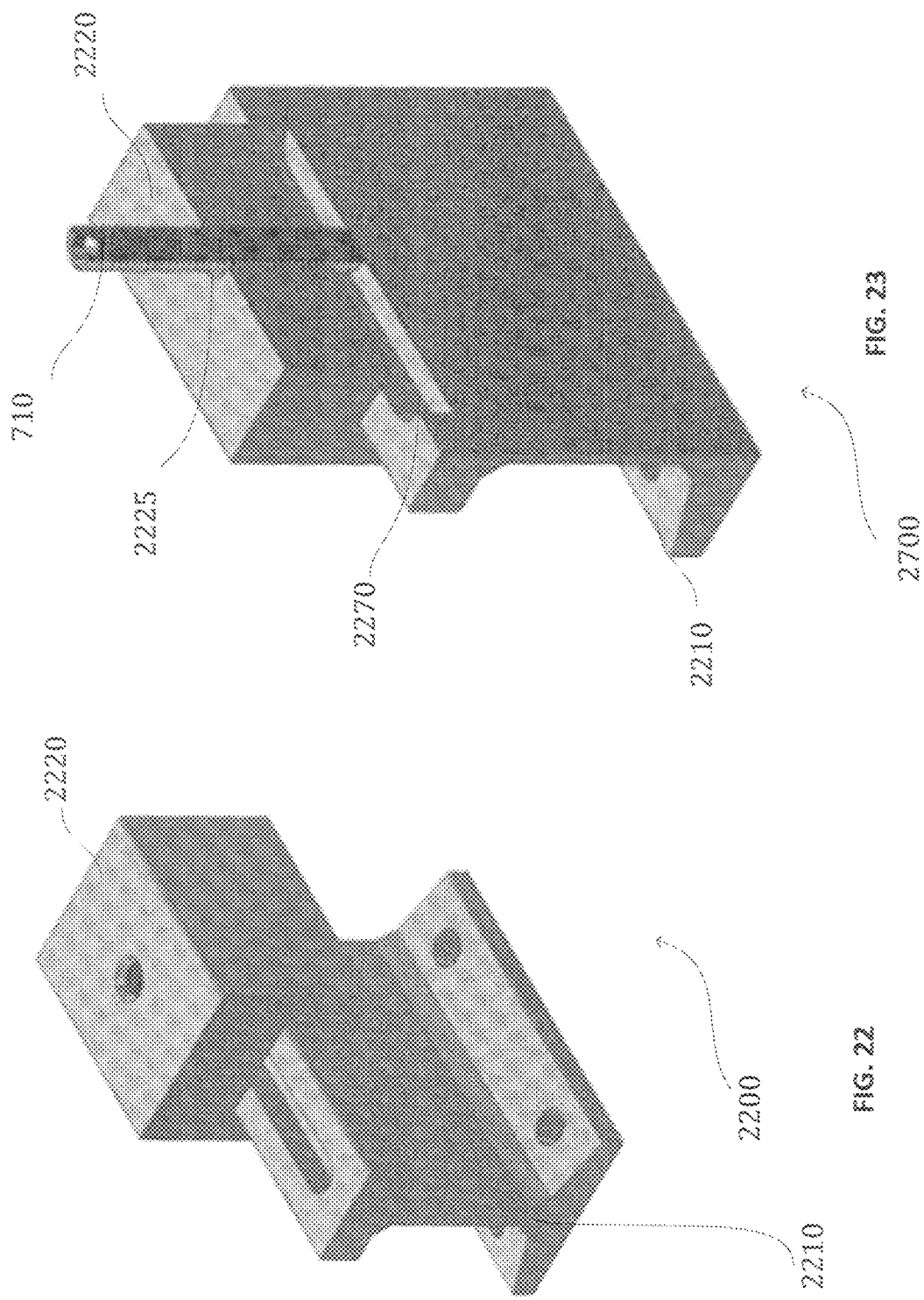

SOLAR PANEL MOUNTING CLAMP AND SYSTEM

CROSS-REFERENCE TO RELATED APPLICATION

This application claims the benefit under 35 U.S.C. § 119(e) of the earlier filing date of U.S. Provisional Patent Application No. 62/360,452 filed on Jul. 10, 2016, the contents of which are hereby incorporated by reference in their entirety.

BACKGROUND

Solar panel based electric systems typically comprise one or more solar panels. The system itself is typically assembled on the roof of a building, on a ground mounted frame, or on a pole mounted frame, which may be set upon a wall or other structure. A solar panel electrical system may comprise one solar panel or two or more solar panels. Each solar panel includes one or more cables, which are typically applied in serial or parallel fashion from one panel to the next. These cables include a ground wire assembly, which is used to ground the solar panels and the underlying frame at appropriate points. Often the grounding and other wires must be tied down to secure the wires and prevent the wires from being damaged. In a typical case, the grounding assembly requires a number of grounding screws or bolt systems, which must be provided in several places depending on the number of solar panels. Each solar panel must attach to at least one grounding wire assembly, and each portion of the mounting assembly must be similarly grounded to the grounding wire assembly.

A solar panel electrical system typically comprises one or more arrays of solar panels mounted on a solar panel mounting system. The solar panel mounting system of a solar panel based electrical system typically is formed from a number of metal rails or poles that extend in parallel along the length of the solar panels to form a frame or support structure, and these rails are then typically attached to a roof structure, mounted on the ground or mounted to one or more poles, which may be affixed for example in a wall structure. As mentioned above, these metal rails or poles are also grounded to the electrical grounding wire assembly. In a typical installation, each solar panel is mounted to the mounting system using various types of clamps. These clamps typically differ depending on which portion of the solar panel system is being mounted, for example a panel mounted on the end of a solar panel array may require different clamp components for securing the edge of the solar pane that forms the end-edge of an array and for securing edges that are internal to the array, or for securing a panel that is centrally mounted to the solar panel electrical system such that each edge of the centrally mounted panel is an internal-edge of the array. When a solar panel system is installed on a roof, various types of roof mounting brackets are used depending on the type of roof upon which the solar panels are mounted which may require different solar panel mounting components.

Roof mounting systems are used to attach various structures to roofs, such as snow barricades, solar panels, lightning protection, mechanical equipment and other accessories such as signage and poles. Roof mounting systems are known for attaching to various types of roofs and roofing materials, including seamed or metal roofs, wood roofs and membranous roofs. Due to the weight of, or weight that must be supported by, such structures, and the need for the structures to remain stable in various weather conditions, the integrity of the entire system, including the attachment of the structures to the roofs, as well as attachments between the mounting system and the mounted structures, is critical. Similarly, when mounting a solar panel system to a roof mounting system, the structural integrity of each system must be maintained.

Using conventional solar panel mounting systems to mount and support a solar panel electrical system is a labor intensive effort requiring the assembly of many different parts and different connectors as discussed above. Installation of the many different parts also requires various different tools on hand to enable the installation. Furthermore, typical systems require substantial labor and organization in order to efficiently manage the cabling of the electrical cables, including the grounding cables. Additionally, substantial labor is required to ensure that each component of the solar panel electrical and mounting systems is properly grounded.

Accordingly, it is desirable to have a simplified solar panel mounting system that easily integrates to existing mounting system, reduces the number of parts required, reduces the number of tools require, simplifies the management of the electrical cabling, and reduces the amount of effort necessary to properly ground the solar panel electric and mounting systems.

BRIEF DESCRIPTION OF THE DRAWINGS

FIG. 1 is a front view of one embodiment of a solar panel mounting clamp in accordance with the present invention.

FIG. 2 is a front perspective view of detail D3 of FIG. 1 showing a knurling pattern on the surface of a portion of the solar panel mounting clamp.

FIG. 3 is a front perspective view of detail D2 of FIG. 1 showing a chamfered edge of a portion of the solar panel mounting clamp.

FIG. 4 is a bottom perspective view of one embodiment of a solar panel mounting clamp in accordance with the present invention.

FIG. 5 is a top perspective view of one embodiment of a solar panel mounting clamp in accordance with the present invention.

FIG. 11a is a cross sectional view along line A-A of FIG. 10a.

FIG. 12a is a bottom perspective view of one embodiment of a mounting plate portion of a solar panel mounting clamp in accordance with the present invention.

FIG. 12b is a bottom perspective view of one embodiment of a mounting plate portion of a solar panel mounting clamp in accordance with the present invention.

FIG. 13a is a top perspective view of one embodiment of a mounting plate portion of a solar panel mounting clamp in accordance with the present invention.

FIG. 13b is a top perspective view of one embodiment of a mounting plate portion of a solar panel mounting clamp in accordance with the present invention.

FIG. 14a is a perspective view of a portion of FIG. 13a.

FIG. 14b is a perspective view of a portion of FIG. 13b.

FIG. 15 is a side view of one embodiment of a solar panel mounting clamp in accordance with the present invention installed on a roof mounting bracket.

FIG. 16 is a top perspective view of one embodiment of a solar panel mounting clamp in accordance with the present invention installed on a roof mounting bracket.

FIG. 17 is a top view of one embodiment of a solar panel mounting clamp in accordance with the present invention.

FIG. 18 is a side view of one embodiment of a solar panel mounting clamp in accordance with the present invention installed on a roof mounting bracket.

FIG. 19 is a cross-sectional view along line A-A of the solar panel mounting clamp of FIG. 17 securing a solar panel.

FIG. 20 is a side view of one embodiment of a solar panel mounting clamp in accordance with the present invention installed on a roof mounting bracket and securing a solar panel.

FIG. 22 illustrates a sliding roof mounting bracket system consisting of two components.

FIG. 23 illustrates a cross sectional view of the sliding roof mounting bracket system of FIG. 22.

DETAILED DESCRIPTION

Figure 6:
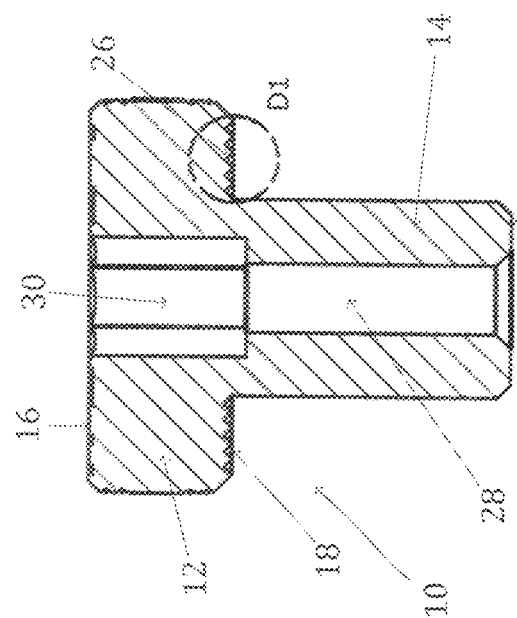
FIG. 6 is a top view of one embodiment of a solar panel mounting clamp in accordance with the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

FIGS. 1-9 show a preferred embodiment of a solar panel mounting clamp 10. FIG. 1 shows one aspect of a solar panel mounting clamp 10. In this embodiment clamp 10 may be installed upon a threaded projection (not shown), such as a screw, for example a screw having a hexagonal head for engaging the screw with a hex wrench for threadably fastening the screw into a threaded receiving portion embedded in a mounting surface. Such mounting surfaces could include mounting blocks, a roof, a roof mounting system, a frame, a wall, concrete or a solar panel mounting system. In one embodiment clamp 10, may, from a top or bottom view, be cylindrical in shape and has two portions, an upper portion, or first member, 12 and a lower portion, or second member, 14. Each of upper portion 12 and lower portion 14 may each be cylindrical in shape such that upper portion 12 has a greater diameter than a diameter of lower portion 14. Alternatively upper portion 12 may be formed such that its profile from a top view is a square shape, or a triangular shape, or any suitable shape so as to facilitate hand tightening of the clamp 10 to, for example, a threaded projection (not shown), so long as a width of the upper portion 12 is greater than the diameter of the cylindrical lower portion 14. In a preferred embodiment, upper portion 12 may be cylindrical in shape and may have a knurling pattern 22 embedded in the sidewall of the upper portion 12 as illustrated in detail in FIG. 2 to allow the clamp to be threadably fastened to a threaded projection by hand.

As shown in FIG. 1, the upper portion 12 has a top surface 16 and a bottom surface, or base, 18. The lower portion 14 is disposed upon the base 18 of the upper portion 12. Upper portion 12 has a greater width than the diameter of lower portion 14 and the bottom surface 18 extends radially away from lower portion to create a lip structure, or a flange member, of the upper portion 12. In this way, in a preferred embodiment from a side view such as shown in FIG. 1, the upper portion 12 and lower portion 14 together appear to form a "T-shaped" clamp. As shown in FIG. 1 and in further detail in FIG. 3, the lower portion 14 has a bottom surface 20 at the distal end of the lower portion 14 from the juncture between lower portion 14 and upper portion 12. The transition from the sidewall of the lower portion 14 to the bottom surface 20 may be a chamfered surface 24, or may be rounded (not shown) or may be square (not shown).

FIG. 4 illustrates a bottom perspective view of clamp 10. In order to receive a projection (not shown), for example a threaded projection such as a bolt or a screw, lower portion 14 of clamp 10 comprises a void 28 formed along a central axis of the lower portion 14, such that the central axis is perpendicular to a plane including bottom surface 20 or a plane including bottom surface 18 or a plane including top surface 16. This void 28 may for example be a cylindrically shaped central axial through-hole, and it will be appreciated that this void defines an internal wall along the boundary between the lower portion 14 and the void 28. This internal wall may comprise a threaded length, or threaded portion, in which case the void 28 and threaded internal wall may comprise a threaded receiving portion for threadably fastening the clamp 10 to a threaded projection, such as a bolt or a screw, or any suitable projection capable of being securely received by the clamp 10. The void 28 may also be a threaded central axial hole that does not pass all the way through the lower portion 14. For example, the central hole may form a void that passes half way through the lower portion 14, or three quarters through the lower portion 14, such that where the void and inner walls form a threaded receiving portion, the clamp 10 is capable of receiving a threaded projection into the lower portion 14. This may be useful in a case where it is known that the threaded projection length will not exceed a certain length (for example where it is known that upon installation the threaded projection will extend at most halfway or three quarters of the way into the lower portion) and where it is known that once received into the threaded receiving portion of the lower portion 14 no further manipulation of the threaded projection, for example by a wrench, a socket driver, or screw driver, will be required.

Also illustrated in FIG. 4, bottom surface 18 of the upper portion 12 may include one or more teeth 26 arranged circumferentially around the circumference of the juncture between the lower portion 14 and the upper portion 12. These teeth extend away from the bottom surface 18 predominantly in a direction that is parallel to an axis passing through the center central through-hole 28 of the lower portion 14. In a preferred embodiment the one or more teeth 26, on bottom surface 18 of upper portion 12, are formed by a series of ringed grooves in the bottom surface 18 such that the grooves together form a series of sharp peaks, or teeth, that encircle the juncture between the lower portion 14 and the upper portion 12. Alternatively, bottom surface 18 may include one or more individual teeth arranged around the junction of lower portion 14 and upper portion 12 that is instead of ringed grooves, the teeth may be individual projections extending from the bottom surface 18 of upper portion 12.

Clamp 10 may secure, for example, a panel, by receiving a threaded projection into the threaded receiving portion formed by void 28. Threadably tightening the clamp 10 onto a threaded projection mounted in a fixed mounting surface, the clamp thereby secures the panel between the bottom surface 18 of the upper portion 12 and the fixed mounting surface, such that the teeth 26 may bite onto, and/or may bite into the surface of the panel body thereby scraping away an insulating protective layer, such as an anodized layer, a layer of paint, a protective coating, or any other protective non-conductive layer, to create a metal-to-metal bond between the clamp 10 and the solar panel body. As will be appreciated this metal-to-metal bond is electrically conductive such that the metal body of the clamp 10 and the metal of the solar panel body form a single conductive surface. It will be further appreciated that by virtue of the metal-to-metal bond, by grounding the body of the solar panel the body of the clamp 10 is similarly grounded, and alternatively by grounding the body of the clamp 10, the solar panel is similarly grounded. Similarly, it will be appreciated that in this way, a plurality of solar panels each secured by a plurality of clamps, such as clamp 10, each making a conductive bond with the respective panels, will each be connected in a single electrically conductive surface, such that by grounding one solar panel, or one clamp 10, all of the plurality of solar panels so secured by the plurality of clamps will be grounded by virtue of the same ground.

The clamp 10 may, furthermore, be used to secure a panel to, for example, a threaded projection embedded in a mounting block (for example, mounting block 200 as shown in FIG. 15). Alternatively, the clamp may be used to secure a panel to any mounting surface having a projection, for example a threaded projection. For example, a threaded projection may be embedded in a block of concrete, or in a frame customized for supporting solar panels allowing a clamp 10 to securely mount a panel between the bottom surface 18 of upper portion 12 and the block of concrete, or the customized frame. In this way it will be appreciated that the clamp 10 may be used to mount a panel to any suitable surface capable of applying a normal force in opposition to the securing force applied by the clamp 10. It will also be appreciated that the threaded projection may alternatively be a smooth projection capable of retaining a clamp secured to the projection by a tension or compression force, in which case it will be appreciated that instead of threadably fastening the claim 10 to a projection, the clamp may have an integral mechanism for applying pressure to a projection (not illustrated) such as a compression lock a pole lock or a shaft lock.

FIG. 5 illustrates a top perspective view of clamp 10 showing top surface 16 of upper portion 12 and lower portion 14. Upper portion 12 further comprises a void 30, formed along a central axis of the upper portion 12, such that the central axis is perpendicular to a plane including bottom surface 20 or a plane including bottom surface 18 or a plane including top surface 16. In a preferred embodiment void 30 and void 28 share a central axis, such that the two form a central axial through-hole that passes through the length of clamp 10 from top surface 16 to bottom surface 20. The void 30 of upper portion 12 may also be cylindrical in shape thus forming internal sidewalls along the border of upper portion 12 and void 30. In such a case the diameter of void 30 may be equal to the diameter of void 28; however, the diameters need not be equal in length. Instead, the void 30 may have a greater diameter than void 28, or void 30 may have a smaller diameter than void 28. According to one or more embodiments, void 30 may alternatively be other than cylindrically shaped, for example, void 30 may be hexagonally shaped, to allow a hex wrench to engage the upper portion to further threadably tighten clamp 10 to a threaded projection in addition to hand tightening. In one or more embodiments, where void 30 is hexagonally shaped, void 30 may further allow a hexagonal wrench to pass through upper portion 12 through void 30 to engage a hexagonal screw received into void 28. It will be appreciated that void 30 may be sized to allow other wrenches, socket drivers or screw-driver mechanisms to pass through void 30 to engaged a threaded projection received into void 28 having other types of mechanisms for receiving a threading force, for example a Philips head screw driver, or a square headed driver, a star shaped driver, a socket driver, or any other suitable torquing device. Alternatively, according to one or more embodiments, irrespective of the shape of void 28 and void 30, there may be a barrier member formed of a portion of upper portion 12 and/or lower portion 14 between void 28 and void 30 so that the two central axial through-holes formed by voids 28 and 30 are separated and do not intersect.

In a preferred embodiment, the clamp is manufactured by aluminum extruding. Secondary operations are required to cut, drill, tap, machine and stamp a logo with various tools such as a CNC machine. The clamp will then be put through a process to create a smooth finish, for example the process may be a tumbling process. It will be appreciated that upper portion and lower portion may be, for example, cut from the same extrusion. Alternatively, the clamp may be die-cast and then subjected to secondary operations.

Figure 7:
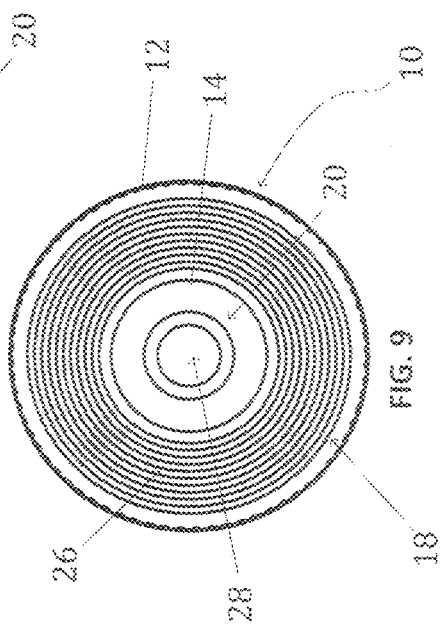
FIG. 7 is a cross-sectional view along line A-A of FIG. 6.
Figure 8:
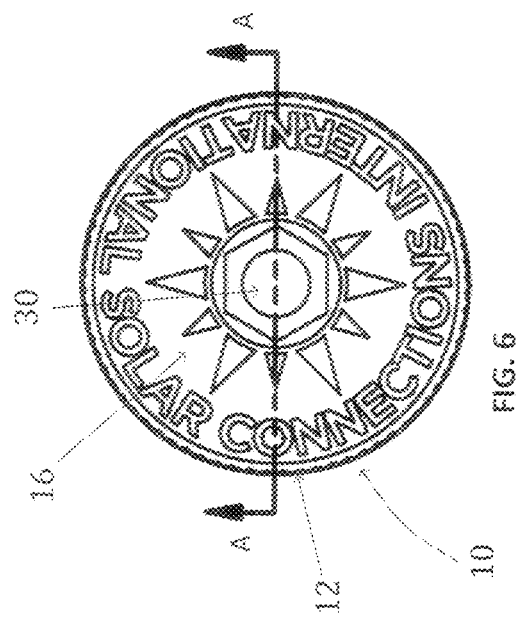
FIG. 8 is a detailed cross-sectional view of detail D1 of FIG. 6.
Figure 9:
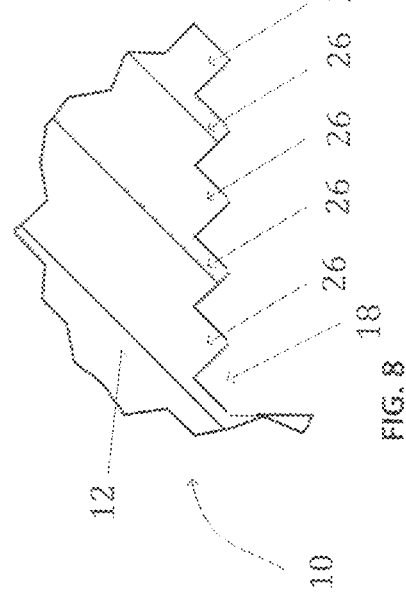
FIG. 9 is a bottom view of one embodiment of a solar panel mounting clamp in accordance with the present invention.

FIG. 6 illustrates a top view of one or more embodiments of clamp 10 showing top surface 16 of upper portion 12 having a void 30 having a hexagon shape thus forming a hexagonal void 30. FIG. 7 illustrates a cross-sectional view of FIG. 6 along line A-A, showing a cross section of upper portion 12 and a cross section of lower portion 14. In this cross-sectional view it can be seen that bottom surface 18 of upper portion 12 comprises one or more teeth 26 arranged in a concentric fashion and set radially away from a central axis passing through voids 30 and 28. These teeth 26 extend away from bottom surface 18 of upper portion 12 such that when a panel is secured between a fixed mounting surface and the bottom surface 18 of top portion 12, the teeth 26 make contact with the panel. FIG. 8 illustrates a detailed view of top portion 12 showing five sets of teeth 26 on bottom surface 18 of top portion 12. FIG. 9 illustrates a bottom view of clamp 10 showing bottom portion 20 having void 28 forming a central axial through-hole in bottom portion 14 centered in bottom surface 20 of bottom portion 14. A series of teeth 26 are illustrated on bottom surface 18 of top portion 12 such that the teeth 26 are arranged circumferentially around bottom portion 14 and in a series extending radially away from the circumference of bottom portion 14.

Figure 10A:
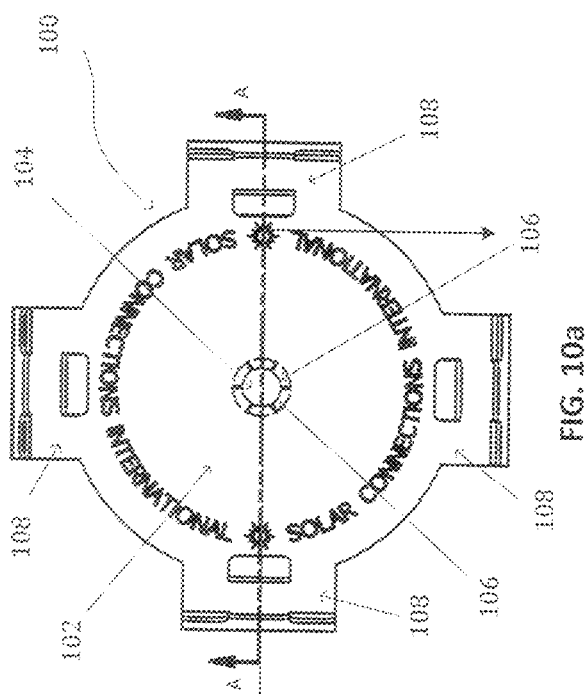
FIG. 10a is a top view of one embodiment of a mounting plate portion of a solar panel mounting clamp in accordance with the present invention.
Figure 10B:
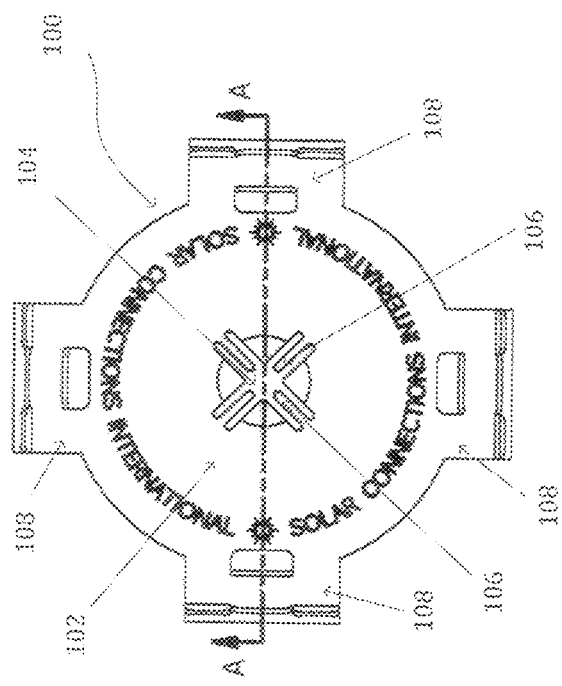
FIG. 10b is a top view of one embodiment of a mounting plate portion of a solar panel mounting clamp in accordance with the present invention.

FIGS. 10a, 10b, 11a, 11b, 12a, 12b, 13a, 13b, 14a and 14b illustrate additional aspects of various embodiments of a solar panel mounting clamp in accordance with the present invention. FIGS. 10a and 10b illustrate embodiments of a mounting plate 100. Mounting plate 100 may serve to rest upon a fixed mounting surface (not shown) such that a solar panel (not shown) may be supported upon the top surface 102 of plate 100. Further mounting plate 100 may serve to support a solar panel upon top surface 102 in order to secure the panel between top surface 102 of mounting plate 100 and, for example, a clamp. The clamp may be in accordance with an embodiment of the present invention, for example it may be clamp 10, embodiments of which are illustrated in FIGS. 1-9.

Figure 11A:
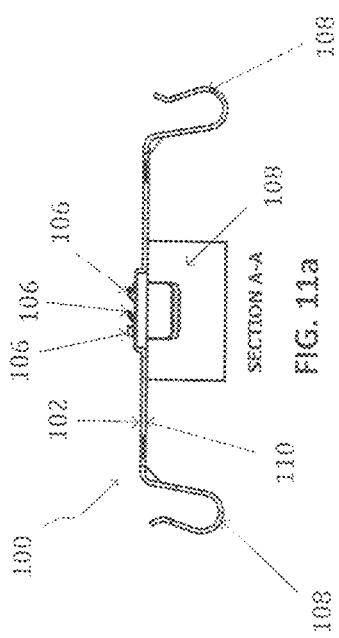
Figure 11B:
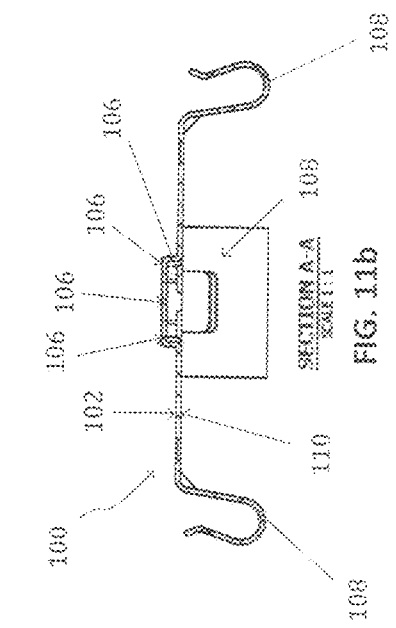
FIG. 11b is a cross sectional view along line A-A of FIG. 10b.

As shown in FIGS. 10a and 10b, embodiments of plate 100 may be cruciform in shape, or plus sign in shape, from a top perspective, and may further have a center portion that is circular in shape; and according to alternative embodiments, the plate may be square in shape. It will be appreciated that the plate 100 may have any suitable shape for supporting a panel. Plate 100 comprises a through-hole 104 which may be centrally located in the center of the plate 100. Plate 100 may further comprise one or more tabs 106 extending from the body of plate 100 anti-radially inward towards a center of the central through-hole 104. Tabs 106 may alternatively extend inward, only partially inward and also partially upward or downward, and may be raised or lowered from the plane including top surface 102 when viewing from a side view as is shown in FIGS. 11a and 11b. These one or more tabs 106 may be formed, for example, by a series of cuts into the body of plate 100 nearest the central through-hole 104 and radially away from the center of central through-hole 104. Where these tabs 106 are formed by cuts into the body, the cuts may have an "L" shape to them as illustrated in FIG. 14a, showing a detailed perspective view of an embodiment of plate 100 focusing on central through-hole 104 and tabs 106. These tabs may also be cut and formed to have various different shapes, and may be raised (or lowered) away from the plane of the plate surface 102 as shown in FIG. 14b, showing a detailed perspective view of an alternative embodiment of plate 100 focusing on central through-hole 104 and tabs 106. The tabs 106, in either case, form a slip lock mechanism allowing the plate 100 to be secured to a threaded projection. One will appreciate that when plate 100 is forcibly placed over a projection (not shown) such as a threaded projection, or screw, the threaded projection or screw is received through through-hole 104 and the tabs 106 will first deflect away in the direction opposite the force applied to the plate 100 allowing the plate to pass over the threaded projection until the plate rests on the surface into which the threaded projection is fixed. Once resting on the surface, the plate may be oriented as desired, and then may be fixed in place by torquing the threaded member to apply a pressure force between the threaded projection and tabs 106 securing the plate 100 in place. FIGS. 11a and 11b illustrate a cross-sectional view of the embodiments of plate 100 of FIGS. 10a and 10b, respectively, along line A-A, and FIG. 11a depicts three tabs 106, whereas in FIG. 11b the tabs comprise tabs raised away from the top surface 102 of plate 100 and also tabs that remain in the plane of surface 102 of plate 100. FIGS. 12a and 12b each illustrate a bottom perspective view of embodiments of plate 100 showing bottom surface 110 of plate 100, and FIGS. 13a and 13b illustrate a top perspective view embodiments of plate 100. The embodiments shown in FIGS. 10a, 10b, 11a, 11b, 12a, 12b, 13a, and 13b further show plate 100 having a plurality of clip members 108.

It will be appreciated that plate 100 may have any suitable number of clip members 108, for example a plate in accordance with the present invention may have only one clip member, or it may have two clip members. In various embodiments the plate may have more than four clip members. As depicted plate 100 has four clip members arranged along two perpendicular lines intersecting at the center of central hole 104 and extending radially away from the circumference of plate 100. Clip members 108 are deformed away from a plane including the top surface 102 of plate 100. Clip members 108 are then bent to create clip structure, for example as depicted in FIGS. 11a and 11b, wherein a cross-sectional side view of embodiments of plate 100 illustrates clip members 108 as having a substantially "U" shaped appearance. It will be appreciated, however, that clip members 108 may be formed to have any suitable shape to allow the clip members 108 to secure one or more cables as part of a cable management system, or to allow one or more securement mechanisms to be secured to the plate 100, for example, one or more guide wires or zip ties may be secured to clip members 108 of plate 100 as part of a cable management system. In various embodiments the clips are retainer clips. In the embodiments depicted in FIGS. 10a, 10b, 11a, 11b, 12a, 12b, 13a, and 13b, the clips may have a hole or void through a portion of the clip, through which one or more retention wires, zip ties, or hooks may be attached as part of a cable management system.

FIGS. 15-20 illustrate various embodiments of a solar panel clamp system 300 assembled upon a standing seam roof mounting bracket 200. Various embodiments of standing seam roof mounting brackets are disclosed in U.S. patent application Ser. No. 14/519,048 entitled "Roof Mounting Bracket and Barricade System" filed on Oct. 20, 2014 which has issued as U.S. Pat. No. 9,353,527 (the "'527 patent). The '527 patent is hereby incorporated by reference in its entirety. These brackets vary in shapes and sizes, but it will be appreciated that solar panel clamps and clamp systems in accordance with this invention may be readily integrated with any of the brackets disclosed in the '048 application.

FIG. 15 illustrates a side view of solar panel mounting system 300 comprising solar panel clamp 310 (similar to clamp 10) and mounting plate 400 (similar to mounting plate 100) are each secured to a projection 332 (shown in FIG. 17) fixed in roof mounting bracket 200. Roof mounting bracket 200 may, for example, be secured to a standing seam roof (not shown) thereby providing a fixed mounting surface for the solar panel mounting system 300. Solar panel mounting system 300 comprises clamp 310 and plate 400. Clamp 310 further comprises top portion, or member, 312 and bottom portion 314. Top portion 312 further comprises a top surface 316, a bottom surface 318 of top portion 312 and one or more teeth 326 arranged upon bottom surface 318. As illustrated clamp 310 is mounted upon a projection 332 fixed in mounting bracket 200. Projection 332 is illustrated from a top view in FIG. 17 which is visible through void 330 in top portion 312 of clamp 310. In a preferred embodiment, projection 332 is a threaded projection threadably secured in mounting bracket 200. As depicted in FIGS. 15-16 clamp 310 is secured such that the bottom surface of bottom portion 314 is touching tabs 406 of plate 400 which are secured to the projection 332. Plate 400 also comprises four clip structures 408 for use as part of a cable management system. Top surface 316 of clamp 310 and top surface 402 of plate 400 each may have one or more symbols, logos or wording engraved or embossed on the respective surfaces 316 and 402.

FIGS. 18-20 illustrate a preferred embodiment of the clamp in accordance with the present invention. FIG. 18 illustrates solar panel mounting system 500, including roof mounting bracket 700, into which is fixed threaded projection 710. Threaded projection 710 may be a hexagonal headed screw, having a hexagonal void 722 in the top portion of projection 710, which allows the threaded projection to be threadably secured to threaded receiving portion 720 of bracket 700, for example by applying a rotational force using a hexagonal wrench inserted into hexagonal void 722. Plate 600 is disposed upon bracket 700 such that threaded projection 710 passes through a central opening in plate 600. Plate 600 further comprises a plurality of tabs 606 anti-radially arranged along the inner circumference of plate 600 formed by the central opening. Plate 600 is disposed upon bracket 700 such that bracket 700 serves as a mounting surface supporting plate 600, and plate 600 is further secured in place by a slip locking mechanism formed from the plurality of tabs 606, which secure the plate 600 to the threaded projection 710. Plate 600 may further comprise a raised center portion 608 in which central opening and tabs 606 are formed. Raised center portion 608 may have a diameter equal to the diameter of bottom portion 514 of clamp 510, which eases alignment and placement of a panel, for example solar panel 800, to be secured by the clamp system 500. FIG. 18 further illustrates top portion 512 of clamp 510 having a top surface 516 and a bottom surface 518, where bottom surface 518 has one or more teeth 526 projecting from it, such that when a panel, such as solar panel 800, is secured by clamp system 500 the teeth 526 may score the surface of the panel 800 or solar panel 900 to create a metal-to-metal bond as illustrated in FIGS. 19-20.

FIG. 19 illustrates a cross-sectional view of FIG. 18 illustrating system 500 along line A-A. FIG. 19 shows roof mounting bracket 700; threaded projection 710 fastenably secured to roof mounting bracket 700 by threaded receiving portion 720; plate 600 secured to threaded projection 710 by a slip lock mechanism formed by tabs 606 such that bottom surface 610 of plate 600 rests upon bracket 700 which acts as a fixed mounting surface; and clamp 510 fastenably secured to threaded projection 710 by a threaded receiving portion, which may be a threaded fastener, formed along the inner circumference formed by central axial void 528 of bottom portion 514 of clamp 510; all of which operates to securely mount panel 800 between bottom surface 518 of top portion 512 of clamp 510 and top surface 602 of plate 600 such that teeth 526 are embedded into the surface of panel 800 to form a metal-to-metal bond. As shown in FIG. 19 it can be seen that top portion 512 of clamp 510 may contain a central axial void 530 which defines a hexagonal shaped internal wall within top portion 512 of clamp 510; and plate 600 may comprise one or more clip portions or clip members 608 which may serve to simplify a cable management system. FIG. 20 illustrates another embodiment of system 500 securing panel 900 which differs in various ways from panel 800, relevantly by having a thinner thickness profile. It will be appreciated that system 500 is capable of securing a wide range of panels having different thickness profiles. For example, as shown in FIG. 20, the clamp 510 may be further threadably secured onto threaded projection 710 until all of threaded projection extending above plate 606 is received into clamp 510, or as shown in FIG. 19 a thicker profile panel may be secured by clamp 510 by leaving some measure of threaded projection exposed between clamp 510 and plate 600. It will be further appreciated that panels having an even thicker profile may be secured by making use of a longer threaded projection, and shorter profile panels may be secured by making use of a clamp 510 having a shorter lower portion 514.

Figure 21:
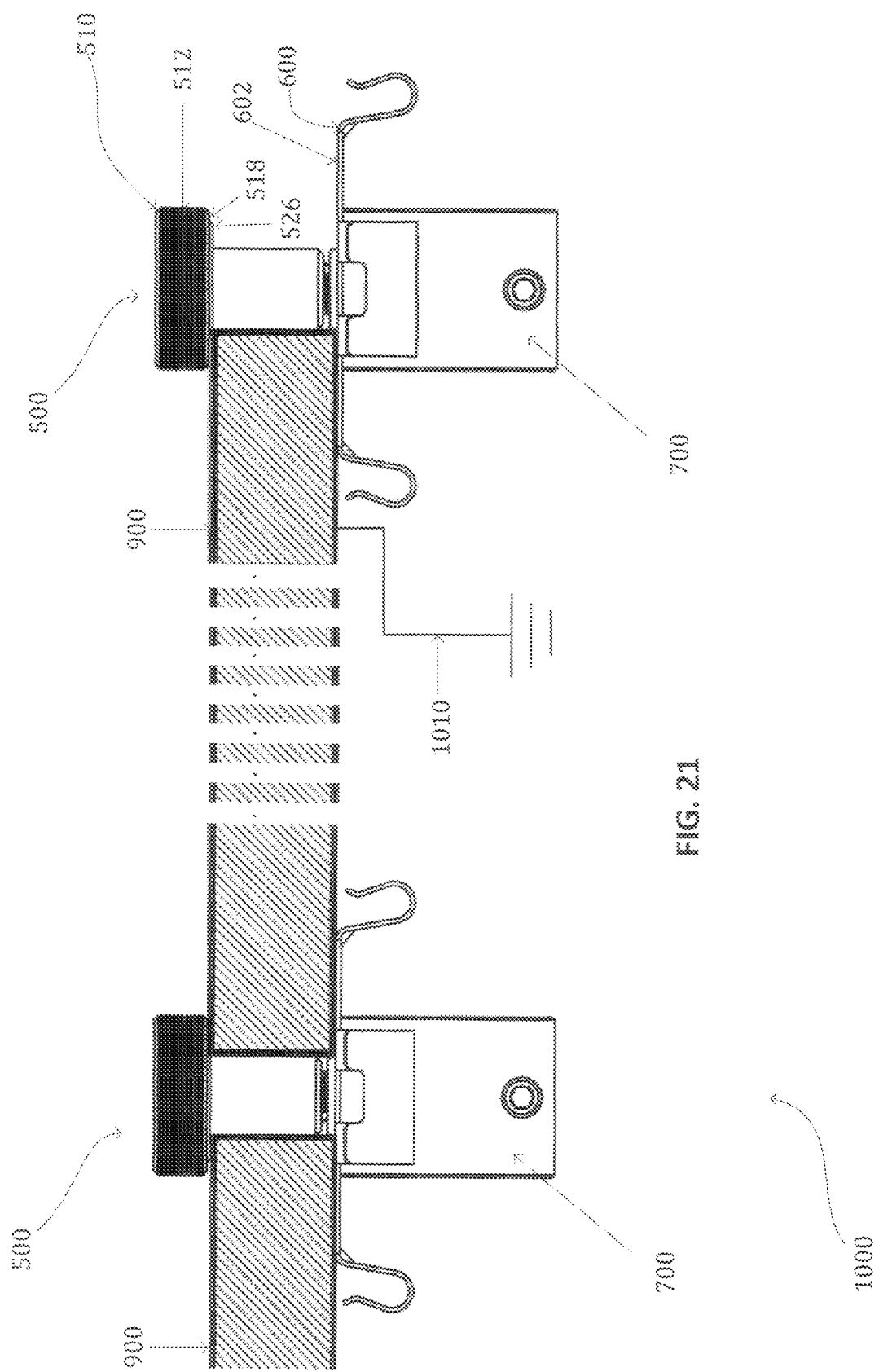
FIG. 21 is a side view of one embodiment of a solar panel mounting system in accordance with the present invention illustrating two solar panel mounting clamps in accordance with one embodiment of the present invention securing two solar panels.

FIG. 21 illustrates mounting and grounding system 1000, which employs a plurality of clamp systems 500, for example mounted on a plurality of roof mounting brackets 700, to secure a plurality of panels 900. Each of the plurality of clamp system 500 comprises a clamp 510 and a plate 600. Each clamp 510 comprises a top portion 512 having a bottom surface 518 from which one or more teeth 526 project away from bottom surface 518 such that when a solar panel 900 is secured between bottom surface 518 of clamp 510 and top surface 602 of plate 600, the teeth 526 score the surface of the panel 900 to remove, for example, an anodized layer to create a metal-to-metal contact. When each of the clamp systems 500 of mounting and grounding system 1000 securably mount one or more panels, each creating a metal-to-metal contact with each panel, all of the panels 900 so secured by all of the clamp systems 500 form a single conductive surface, such that grounding one portion of the system 1000 by grounding wire 1010 effectively grounds the whole system 1000. Grounding wire 1010 is depicted attached to a panel body, but it will be appreciated that grounding wire 1010 may alternatively be attached to any one of the clamp systems 500. It will also be appreciated that each clamp system 500 of mounting system 1000 may serve as an end mounting clamp for securing either side of an end panel in, for example, a solar panel array; or, each clamp system may serve as a centrally located mounting clamp for securing two solar panels that are centrally located within a solar panel array.

FIGS. 22-28 illustrate additional embodiments of the roof mounting brackets using two component sliding roof mounting bracket system. As discussed more fully below the sliding roof mounting bracket system 2200 consists of two components, a mounting base 2210 and a mounting sliding member 2220. The sliding roof mounting bracket system may be used in any roof type including metal roof panels, exposed fastener roof panels, r-panel type roof panels, corrugated type roof panels, shingle roof systems, and membrane type roof systems.

FIG. 22 illustrates a sliding roof mounting bracket system 2200 comprises two components, a mounting base 2210 and a mounting sliding member 2220. For the purposes of illustration, the mounting base 2210 is a flat roof type mounting base described in further detail below with respect to FIG. 25. However, it will be understood that various different mounting bases, such as those described in relation to FIGS. 25, 26 27, can be mounted to the mounting sliding member 2220 as shown in FIG. 22. The mounting sliding member 2220 is shown and descried in detail in relation to FIG. 24. In operation, the mounting sliding member 2220 slides on to the top portion of the mounting base 2210. As discussed below, the shape of the top portion of the mounting sliding member 2220 and the mounting base 2210 is designed to match each other. However, the hollow section of the mounting sliding member 2220 is larger than the top portion of the mounting base 2210 to allow the mounting base 2210 to slide on the mounting sliding member 2220 without too much force.

FIG. 23 illustrates a cross sectional view of the sliding roof mounting bracket system 2200. This cross sectional view shows a threaded projection 710 assembled to the sliding roof mounting bracket system 2200. The threaded projection 710 is shown and described above in relation to FIGS. 18-19. The mounting base 2210 includes a slot 2215 formed in its top surface. The mounting sliding member 2220 includes a threaded receiving portion 2225.

In operation, the mounting sliding member 2220 is engaged with the mounting base 2210. The threaded projectile 710 is engaged with the threaded receiving portion 2225 of the mounting sliding member 2220. The threaded projectile may extend through the threaded receiving portion and may be received within the slot 2215. When the mounting sliding member 2220 is moved in relation to the mounting base 2210 while the threaded projectile 710 is within the slot 2215, the threaded projectile prevents the mounting sliding member 2220 from being removed from the mounting base 2210. When the mounting sliding member 2220 gets close to an edge for the mounting base 2210, the threaded projectile 710 engages an end of the slot 2215. When the desired location of the mounting sliding member 2220 in relation to the mounting base 2210 is found, the threaded projectile 710 is tightened and the end of the threaded projectile 710 engages the floor of the slot 2215, thereby preventing further movement of the mounting base 2210 and the mounting sliding member 2220 relative to each other.

Figure 24:
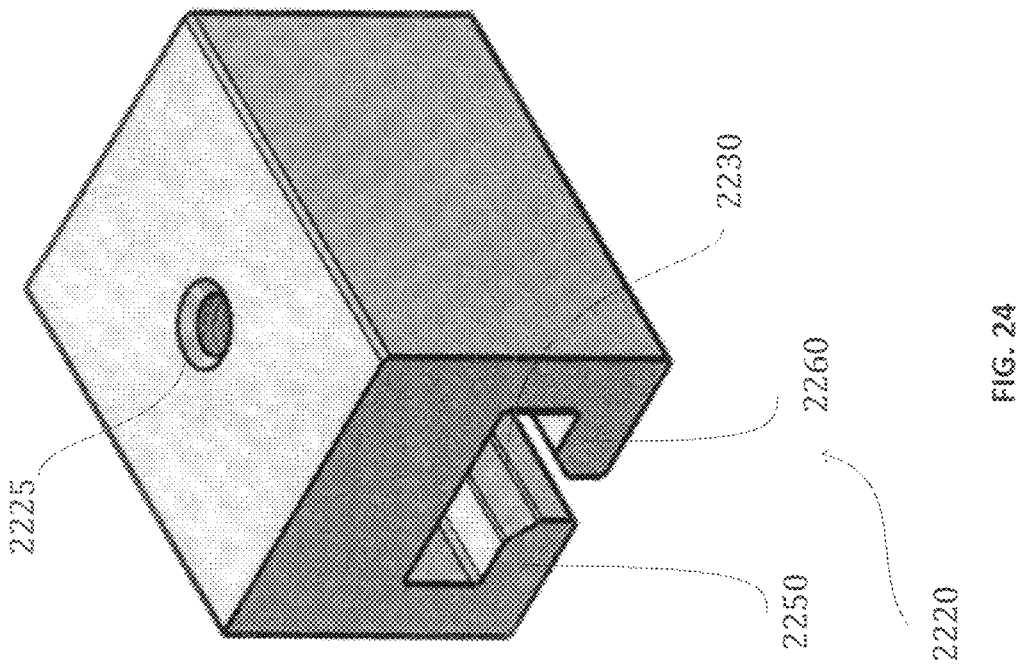
FIG. 24 illustrates a top perspective view of the mounting sliding member of FIG. 22.

FIG. 24 illustrates details of mounting sliding member 2220. The mounting sliding member 2220 includes a threaded receiving portion 2225 into which the threaded projection 710 may be threadably secured. The mounting sliding member 2220 also includes a first member 2250 and a second member 2260. The first member 2250 and the second member 2260 form a hollow channel 2230, open to the bottom of the mounting sliding member 2220 into which the top portion of a mounting base, as shown and described below in relation to FIGS. 25-27, can be inserted. The threaded receiving portion 2225 runs perpendicular to and intersects the hollow channel 2230 and goes through the mounting sliding member 2220. In alternative embodiments, the hollow channel 2230 may be formed in different profiles to allow the mounting sliding member 2220 to move along the mounting base 2210 while preventing the mounting sliding member 2220 from separating from the mounting base 2210 in a direction perpendicular to the hollow channel 2230.

Figure 25:
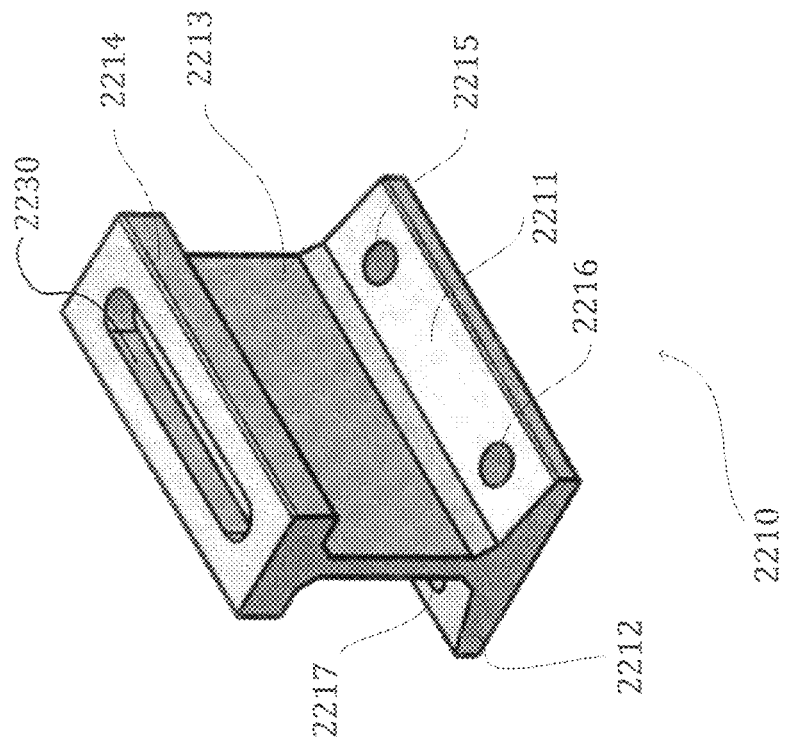
FIG. 25 illustrates a mounting base for the sliding roof mounting bracket system of FIG. 22 for flat or shingle roof panels.
Figure 27:
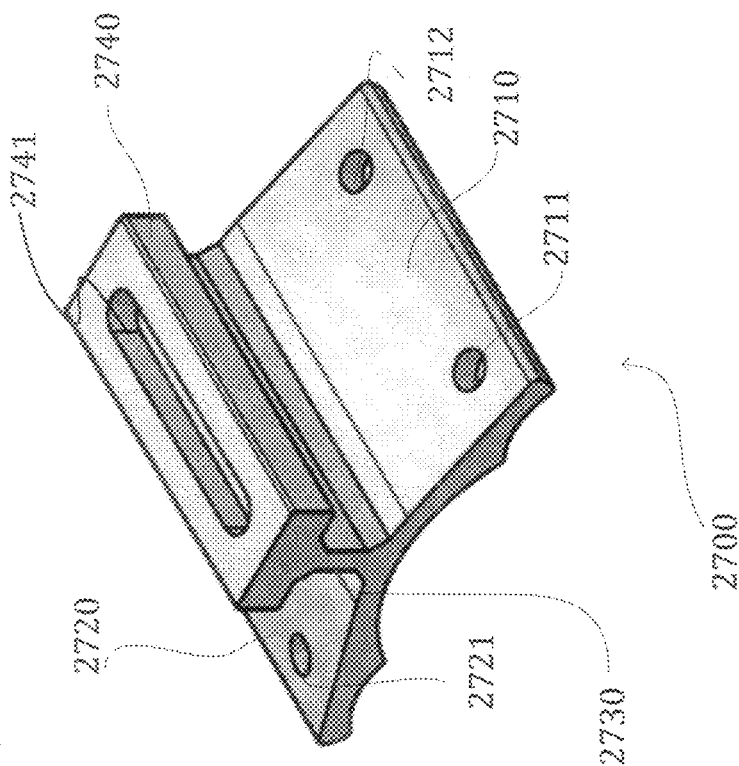
FIG. 27 illustrates a mounting base for the sliding roof mounting bracket system of FIG. 22 for corrugated roof panels.
Figure 26:
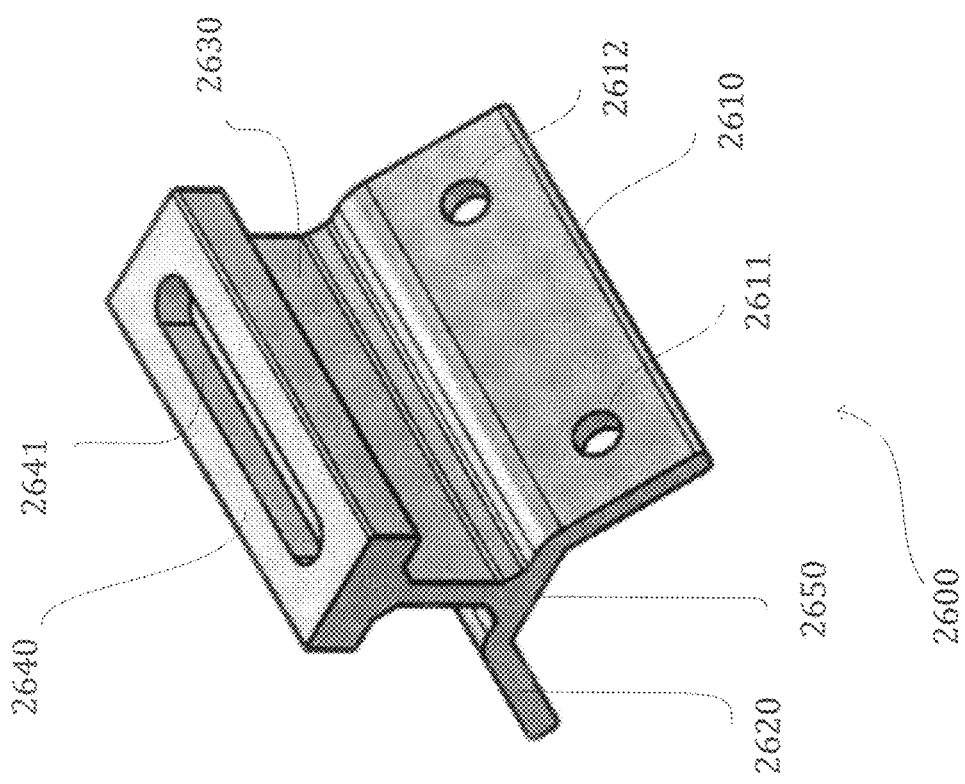
FIG. 26 illustrates a mounting base for the sliding roof mounting bracket system of FIG. 22 for R-Panel type roof panels.

FIGS. 25-27 illustrate various mounting base embodiments. FIG. 25 illustrates a mounting base 2210 for flat or shingle roof panels. The mounting base 2210 includes a first member 2211, a second member 2212, a riser 2213, and a top portion 2214. The first member 2211 includes a first through-hole 2215 and a second through-hole 2216, into which attachment members, such as threaded screws, may be inserted to engage the mounting base 2210 with a shingle roof panel (not shown). The second member 2212 includes a third through-hole 2217 and a fourth through-hole (not shown), into which attachment members, such as threaded screws, may be inserted to engage the mounting base 2210 with a flat or shingle roof panel (not shown). The top portion 2214 includes a shallow slot 2230, into which the threaded projection 710 (not shown) may extend, as described above with respect to FIGS. 22 and 23. The top portion 2214 is wider than the riser 2213 and forms substantially the same profile as the hollow channel 2230 of the mounting sliding member 2220.

FIG. 26 illustrates a mounting base 2600 for R-Panel type roof panels. The mounting base 2600 includes a first member 2610, a second member 2620, a riser 2630, a top portion 2640, and a bottom portion 2650. The first member 2610 includes a first through-hole 2611 and a second through-hole 2612, into which attachment members, such as threaded screws, may be inserted to engage the mounting base 2600 with a corrugated roof panel (not shown). The second member 2620 includes a third and fourth through-hole (not shown), into which attachment members, such as threaded screws, may be inserted to engage the mounting base 2600 with a corrugated roof panel (not shown). Additional through-holes may be added to the first member 2610 and the second member 2620 to create a more secure attachment to a roof. The top portion 2640 includes a shallow slot 2641, into which the threaded projection 710 (not shown) may extend. The top portion 2640 is wider than the riser 2630 and forms substantially the same profile as the hollow channel 2230.

In operation the hollow channel 2230 of the mounting sliding member 2220 is slid onto the top portion 2640 of the mounting base 2600. The T shape created by the top portion 2640 and the riser 2630 allows the mounting sliding member 2220 and the mounting base 2600 to move relative to one another along the length of the hollow channel 2230, while preventing the mounting sliding member 2220 from being detached from the mounting base 2600 in the direction perpendicular to the hollow channel 2230.

It will be appreciated that the length of the riser 2630 can vary to create more or less distance between the roof and the solar panels mounted using the solar panel mounting clamp and system. Similarly, the width of the top portion 2640 can vary based on the shape of the mounting bracket 2220 that will be used with the mounting base 2600.

The width of the bottom portion 2650 and the angle of the first portion 2610 and the second portion 2620 with respect to the bottom portion 2650 may be adjusted to fit the particular R-Panel type roof geometries. In one alternative, the angle between each of the first portion 2610 and second portion 2620 and the bottom portion 2650 is 75 degrees. In other alternatives the angle may be reduced to 15 degrees. In operation, fasteners pass through the through-holes to engage the roof (not shown) and hold the mounting base in place. The bottom side of the first member 2610 and the second member 2620 may be covered with butane tape (not shown) to create a water resistant or water proof seal between the mounting block 2600 and the roof (not shown).

In another alternative, the bottom portion 2650 can be connected to the first portion 2610 and the second portion 2620 using a hinge to allow the angle to be changed based on the specifications of particular roofs. In alternative embodiments, the first member 2610 and the second member 2620 may have more than two through-holes each.

In alternative embodiments, different sealants may be used to create a water resistant or water proof seal between the roof and the mounting bracket.

FIG. 27 illustrates a mounting base 2700 for corrugated roof panels. The mounting base 2700 includes a first member 2710, a second member 2720, a riser 2730, and a top portion 2740. The first member 2710 includes a first through-hole 2711 and a second through hole 2712, into which attachment members, such as threaded screws, may be inserted to engage the mounting block 2700 with a corrugated roof panel (not shown). The second member 2720 includes a third through-hole 2721 and a fourth through-hole (not shown), into which attachment members, such as threaded screws, may be inserted to engage the mounting base 2700 with a corrugated roof panel (not shown). The top portion 2740 includes a shallow slot 2741, into which the threaded projection 710 (not shown) may extend. The top portion 2740 is wider than the riser 2730 and form substantially the same shape as the hollow channel 2230 of the mounting sliding member.

Figure 28:
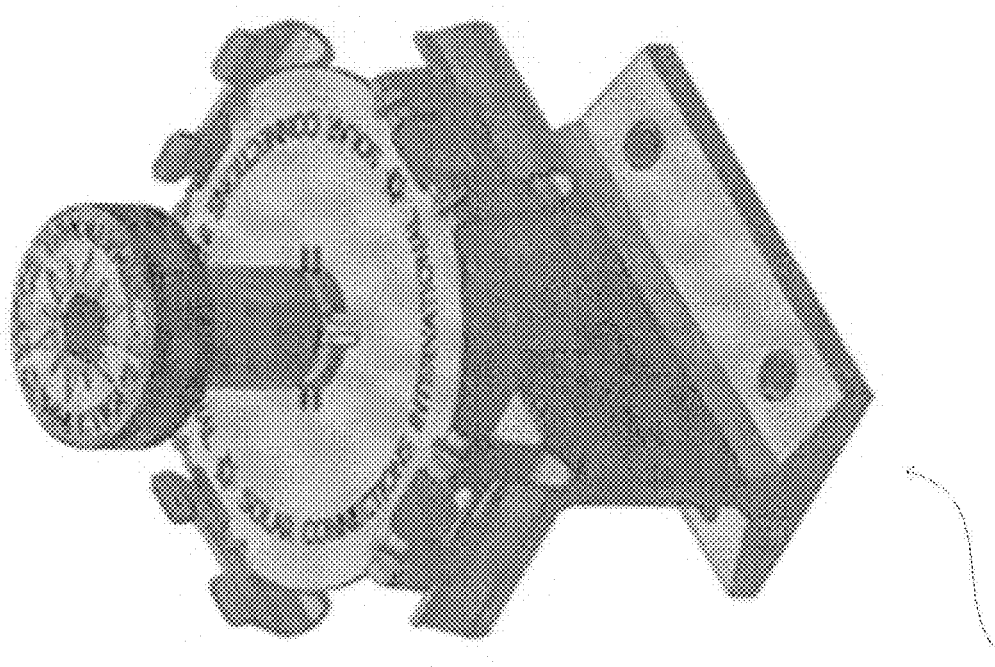
FIG. 28 illustrates a sliding solar panel mounting system.

FIG. 28 illustrates a sliding solar panel mounting system 2800. The sliding solar panel mounting system 2800 illustrates the engagement of the solar panel mounting system 500, described above in relation to FIG. 18-20 with the sliding roof mounting bracket system 2200. For the purposes of illustration, the mounting block is shown as the flat or shingle type mounting base 2220 as shown and described in relation to FIG. 25. However, it will be understood that various different mounting bases, such as those described in relation to FIGS. 26 and 27, can be mounted to the mounting sliding member as shown in FIG. 26. The mounting base is shown and described in detail in relation to FIG. 25.

Figure 29:
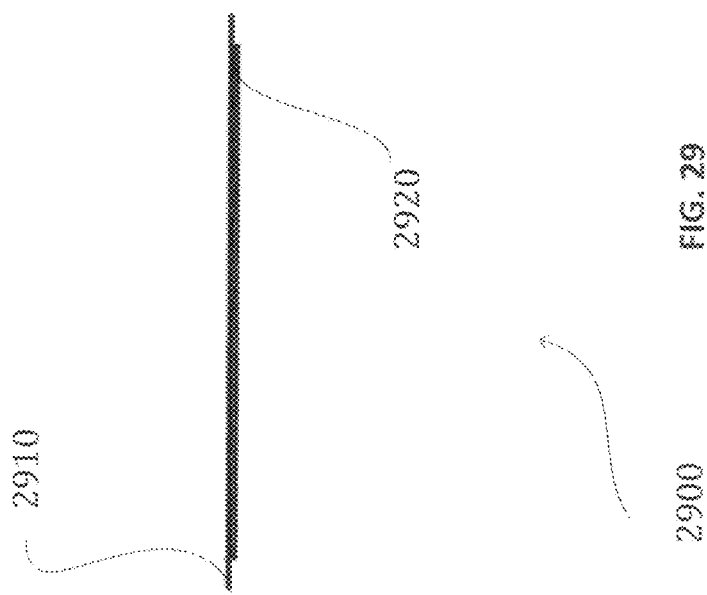
FIG. 29 illustrates a front view of a mounting plate system 2900 for use on shingle type roof systems.

FIG. 29 illustrates a front view of a mounting plate system 2900 for use on shingle type roof systems. The mounting plate 2900 includes a mounting plate 2910 and a pad 2920. The pad 2920 may be a butyl tape. The pad 2920 covers the mounting plate 2910 to provide water resistant or water proof seal in operation. The pad 2920 may be covered with a release liner (not shown) to protect the adhesive pad from sticking to unintended locations prior to installation against a roof shingle.

In operation, a user removes the release liner to expose the pad 2920. The user then places the mounting plate system 2900 directly to the roof shingle. The sliding roof mounting bracket system 2200 as shown and described above in relation to FIG. 22 may then be fastened using screws through the top side of the mounting plate system 2900 on to a roof (not shown). The pad creates a water resistant, or preferably a completely water tight seal without the need for any caulk.

In alternative embodiments, the mounting plate system 2900 may include markings on the mounting plate 2910 to allow the installer proper exposure dimensions and a central line for reference.

Figure 30:
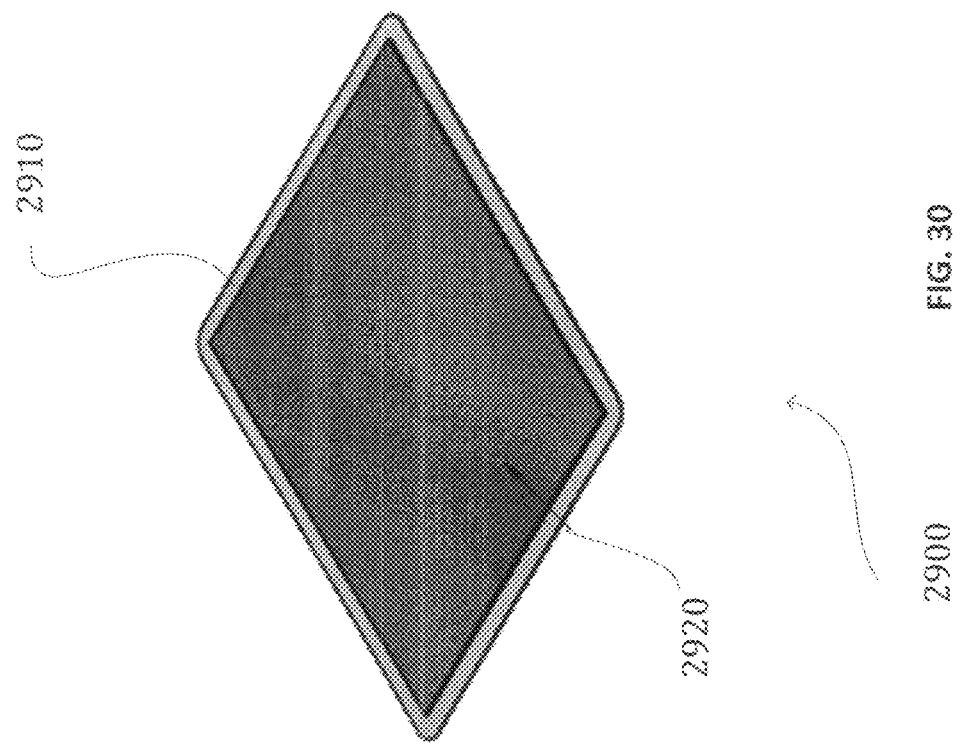
FIG. 30 illustrates a bottom perspective view of the mounting plate system 2900 for use on shingle type roof systems

FIG. 30 illustrates a bottom perspective view of the mounting plate system 2900 for use on shingle type roof systems, including the pad 2920 covering substantial portion of the mounting plate 2910.

Figure 31:
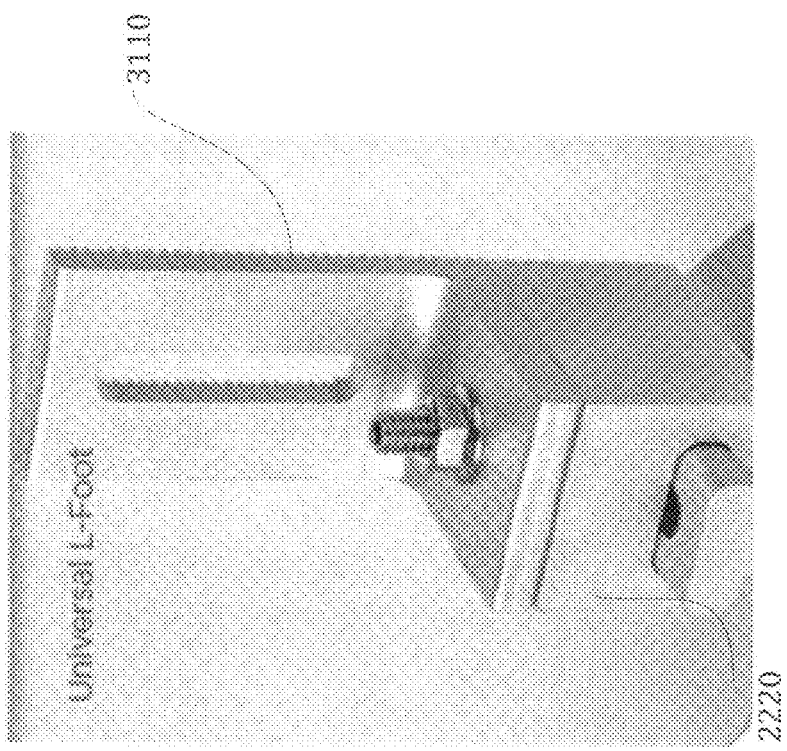
FIG. 31 illustrates an L-connector system 3100.

FIG. 31-35 illustrate an L-Type bracket 3110 for use in connection with conventional commercially available racking systems. FIG. 31 illustrates an L-connector system 3100. The L-connector system 3100 includes an L-type bracket 3110 and the sliding roof mounting bracket system 2200. In the L-connector system 3100, the L-Type bracket 3110 is fastened to the top of the sliding roof mounting bracket system 2200, and attaches to the commercially available racking systems.

Figure 32:
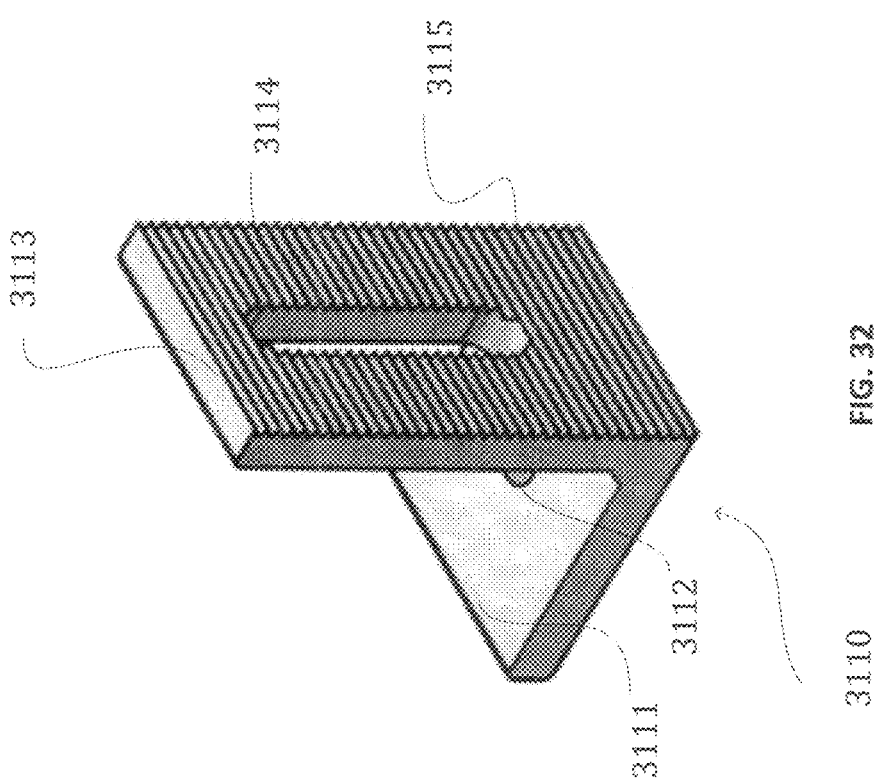
FIG. 32 illustrates a perspective view of the L-type bracket 3110.

FIG. 32 illustrates a perspective view of the L-type bracket 3110. The L-Type bracket 3110 includes a bottom section 3111 and a back section 3113. The bottom section 3111 includes a fastener insert 3112. The fastener insert 3112 may be configured to receive a threaded fastener to create a more secure attachment to the sliding roof mounting bracket system 2200. In alternative embodiments, the fastener insert 3112 may be a through hole. The back section 3113 includes a vertical slot 3114 and a back face 3115. The vertical slot 3114 is configured to receive a second fastener to attach the L-type bracket 3110 onto a conventional racking system (not shown). The slot configuration allows the height of the racking system to be adjusted without replacing the L-type bracket 3110. The back face 3115 is threaded to allow a second bracket (not shown) to securely engage the L-Type bracket 3110.

Figure 33:
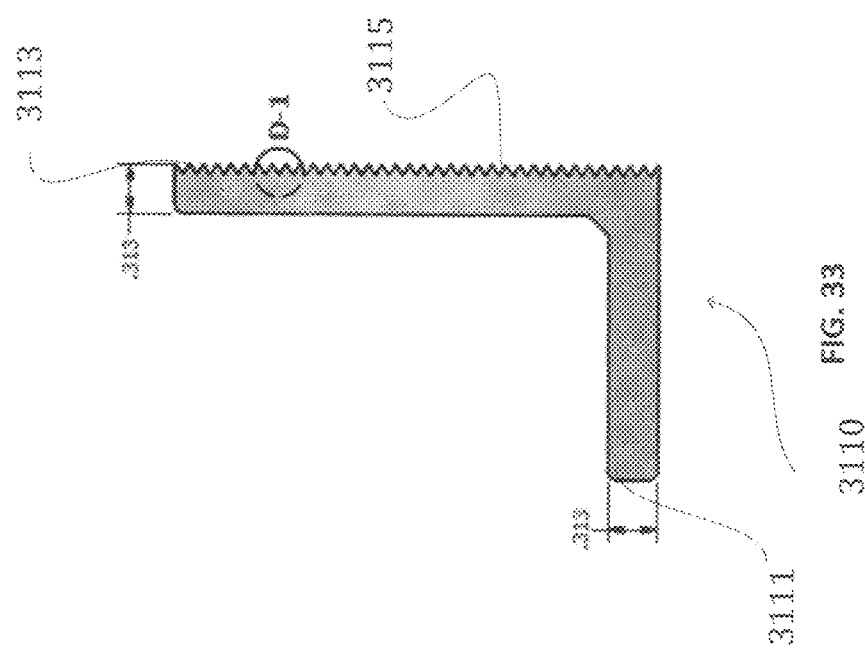
FIG. 33 illustrates a side view of the L-type bracket 3110.
Figure 35:
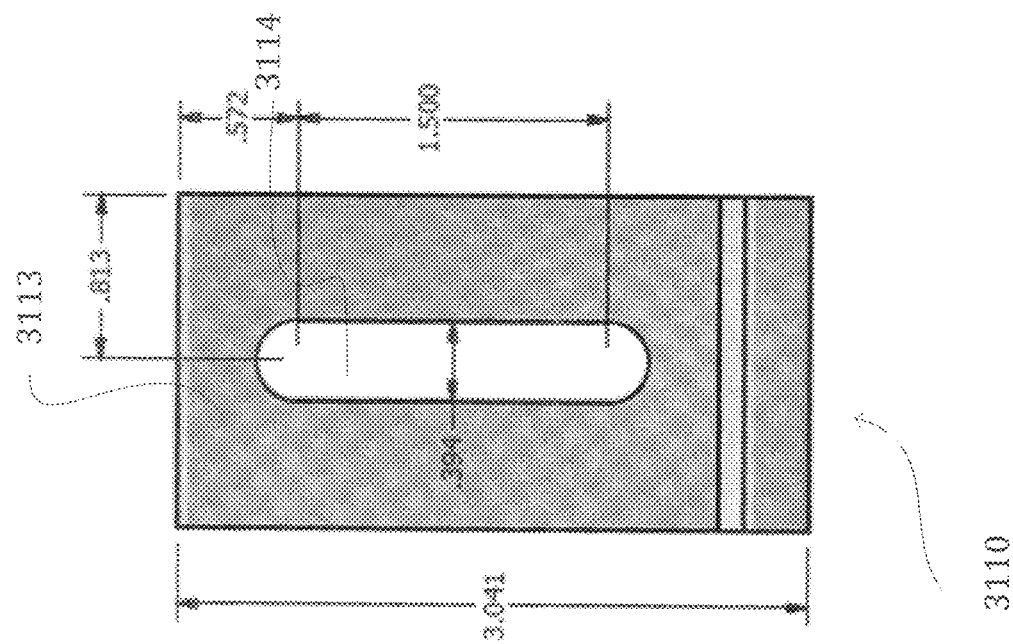
FIG. 35 illustrates a front view of the L-type bracket 3110.
Figure 34:
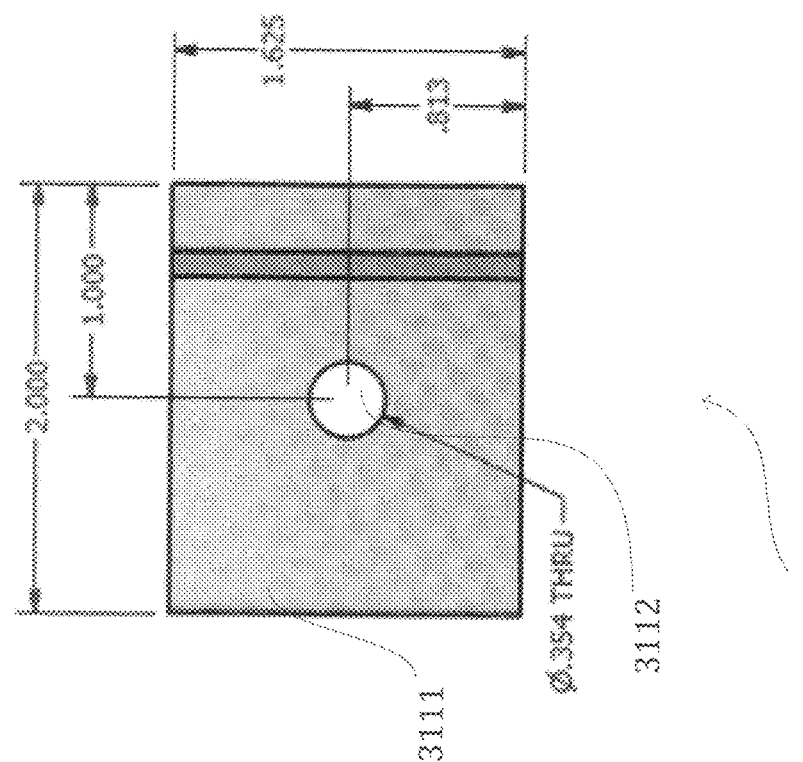
FIG. 34 illustrates a top view of the L-type bracket 3110.

FIG. 33 illustrates a side view of the L-type bracket 3110. FIG. 34 illustrates a top view of the L-type bracket 3110 showing fastener insert 3112 through the bottom section 3111. FIG. 35 illustrates a front view of the L-type bracket 3110 showing vertical slot 3114 in back section 3113.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

I claim:

1. A solar panel mounting clamp comprising:
   a first member having a central axial through-hole, a top surface and a base; and
   a cylindrical member having a central axial through-hole, the cylindrical member disposed upon the base of the first member such that the central axial through-hole of the first member shares an axis with the axial through-hole of the cylindrical member, the central axial through-hole of the cylindrical member forming an inner wall of the cylindrical member, at least a portion of which inner wall comprises a threaded receiving portion capable of receiving a threaded projection;
   wherein the first member has a greater width than the cylindrical member such that the base of the first member extends radially outward from the circumference of the cylindrical member in a direction perpendicular to the axis; and
   wherein the threaded projection is at least partially disposed within the threaded receiving portion, the threaded projection is fixed in a mounting surface; and at least one panel is secured by the base of the first member between it and the mounting surface.

2. The solar panel mounting clamp of claim 1, wherein the central axial through-hole of the first member forms a hexagonal void.

3. The solar panel mounting clamp of claim 1, wherein the base of the first member comprises one or more teeth projecting from the base parallel to the axis and arranged circumferentially around the cylindrical member such that when the threaded receiving portion of the cylindrical member receives the threaded projection in order to secure the at least one panel between the base of the first member and the fixed mounting surface, the one or more teeth form an electrically conductive bond with the at least one panel.

4. The solar panel mounting clamp of claim 3, wherein the first member and the cylindrical member comprise aluminum.

5. The solar panel mounting clamp of claim 4, wherein the at least one panel includes an anodized layer, wherein the one or more teeth form an electrically conductive bond with the at least one panel by removing the anodized layer to form a metal to metal contact between the one or more teeth and the at least one panel.

6. The solar panel mounting clamp of claim 5, wherein the first member has one or more external sidewalls comprising a knurling pattern.

7. The solar panel mounting clamp of claim 1, further comprising a plate having an inner circumference formed by a central hole, the central hole capable of receiving the threaded projection, wherein the inner circumference comprises one or more tabs extending at least partially inward towards a center of the central hole such that the one or more tabs form a slip lock mechanism for securing the plate to the threaded projection.

8. The solar panel mounting clamp of claim 7, wherein the threaded projection is fixed in a mounting surface, wherein the plate receives the threaded projection through the central hole such that the plate is secured to the threaded projection by the slip lock mechanism such that the plate rests on the fixed mounting surface, and wherein the cylindrical member is disposed upon the threaded projection such that the threaded receiving portion of the cylindrical member receives the threaded projection, wherein the first member is capable of securing the at least one panel between the plate and at least a portion of the base of the first member.

9. The solar panel mounting clamp of claim 8, wherein the plate further comprises one or more clip members extending at least partially radially outward from an outer edge of the plate; the clip members being deformed away from a plane including a top surface of the plate.

10. The solar panel mounting clamp of claim 9, wherein the clip members are capable of retaining one or more electrical cables.

11. The solar panel mounting clamp of claim 8, wherein the mounting surface is a roof mounting bracket for securing accessories to seamed panel roof systems.

12. The solar panel mounting clamp of claim 8, wherein the mounting surface is one of the ground, a wall, a frame, a solar panel mounting frame, a solar panel mounting system, or a roof.

13. A system for mounting a plurality of solar panels comprising:
a plurality of threaded projections fixed in a mounting surface;
a plurality of the solar panel mounting clamps of claim 5, each respectively disposed upon one of the plurality of threaded projections such that the threaded receiving portion of each respective one of the plurality of the solar panel mounting clamps threadably receives one of the plurality of threaded projections, such that the plurality of solar panel mounting clamps are capable of securing a plurality of solar panels to the mounting surface such that each clamp makes a conductive bond with one or more panels such that each panel shares a common ground.

14. A solar panel mounting system comprising:
a mounting base having a top portion and a bottom portion connected by a riser, wherein a top surface of the top portion has a slot formed therein;
a mounting sliding member having a threaded portion and a hollow channel, wherein the hollow channel slidably engages the top portion of the mounting base;
a first member having a central axial through-hole, a top surface and a base;
a cylindrical member having a central axial through-hole, the cylindrical member disposed upon the base of the first member such that the central axial through-hole of the first member shares an axis with the central axial through-hole of the cylindrical member, the central axial through-hole of the cylindrical member forming an inner wall of the cylindrical member at least a portion of which inner wall comprises a threaded receiving portion capable of receiving a threaded projection;
wherein the first member has a greater width than the cylindrical member such that the base of the first member extends radially outward from the circumference of the cylindrical member in a direction perpendicular to the axis; and
a threaded projection threadably received by each of the central axial through-hole of the first member, the central axial through-hole of the cylindrical member, and the threaded portion of the mounting sliding member;
wherein the threaded projection extends into the slot in the top portion of the mounting base.

15. The solar panel mounting system of claim 14 wherein the top portion of the base member has a substantially the same shape as the hollow channel of the mounting sliding member.

16. The solar panel mounting system of claim 14 wherein the threaded projection abuts the surface of the top portion of the mounting base member in the slot to restrict movement of the mounting sliding member relative to the mounting base.

17. The solar panel mounting system of claim 14 wherein the length of the slot is less than the length of the top portion of the base.

* * * * *